United States Patent
Choi et al.

(10) Patent No.: US 7,548,293 B2
(45) Date of Patent: Jun. 16, 2009

(54) LIQUID CRYSTAL DISPLAY

(75) Inventors: Jeong-ye Choi, Suwon-si (KR);
Mun-pyo Hong, Seongnam-si (KR);
Wang-su Hong, Suwon-si (KR);
Soo-guy Rho, Suwon-si (KR); Sang-il Kim, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 565 days.

(21) Appl. No.: 11/111,408

(22) Filed: Apr. 21, 2005

(65) Prior Publication Data

US 2006/0007087 A1 Jan. 12, 2006

(30) Foreign Application Priority Data

May 25, 2004 (KR) .................... 10-2004-0037107

(51) Int. Cl.
*G02F 1/1335* (2006.01)
(52) U.S. Cl. ...................... 349/114; 349/106
(58) Field of Classification Search .............. 349/114
See application file for complete search history.

(56) References Cited

U.S. PATENT DOCUMENTS

| | | | |
|---|---|---|---|
| 6,836,300 B2* | 12/2004 | Choo et al. | 349/43 |
| 7,050,132 B2* | 5/2006 | Okamoto et al. | 349/114 |
| 7,092,055 B2* | 8/2006 | Maeda et al. | 349/114 |
| 7,102,713 B2* | 9/2006 | Nam et al. | 349/114 |
| 2003/0117551 A1* | 6/2003 | Fujimori et al. | 349/113 |

FOREIGN PATENT DOCUMENTS

| | | |
|---|---|---|
| JP | 2000111902 | 4/2000 |
| JP | 2003-255399 | 9/2003 |
| JP | 2004-004828 | 1/2004 |
| KR | 2003-21851 | 3/2003 |
| KR | 2003-55846 | 7/2003 |

* cited by examiner

*Primary Examiner*—Richard H Kim
(74) *Attorney, Agent, or Firm*—F. Chau & Associates, LLC

(57) ABSTRACT

A semi-transmission liquid crystal display comprising a liquid crystal panel; a backlight unit to emit light to the liquid crystal panel; and a data driver to apply a data voltage to a data line of the liquid crystal panel; wherein, the liquid crystal panel comprises a TFT substrate which has a transmission area transmitting light from the backlight unit and a reflection area reflecting light from exterior, a color filter substrate which has color filter layer having a concave area which is formed corresponding to the reflection area, and a liquid crystal layer which is sandwiched between the TFT substrate and the color filter substrate and having varying thickness according to the concave area; and the data driver applies the data voltage to the data line in the liquid crystal panel by a transmission voltage mode when the backlight unit is on and by a reflection voltage mode when the backlight unit is off, which configuration provides a semi-transmission LCD having good display quality without an overcoat layer flattening a color filter layer.

17 Claims, 9 Drawing Sheets

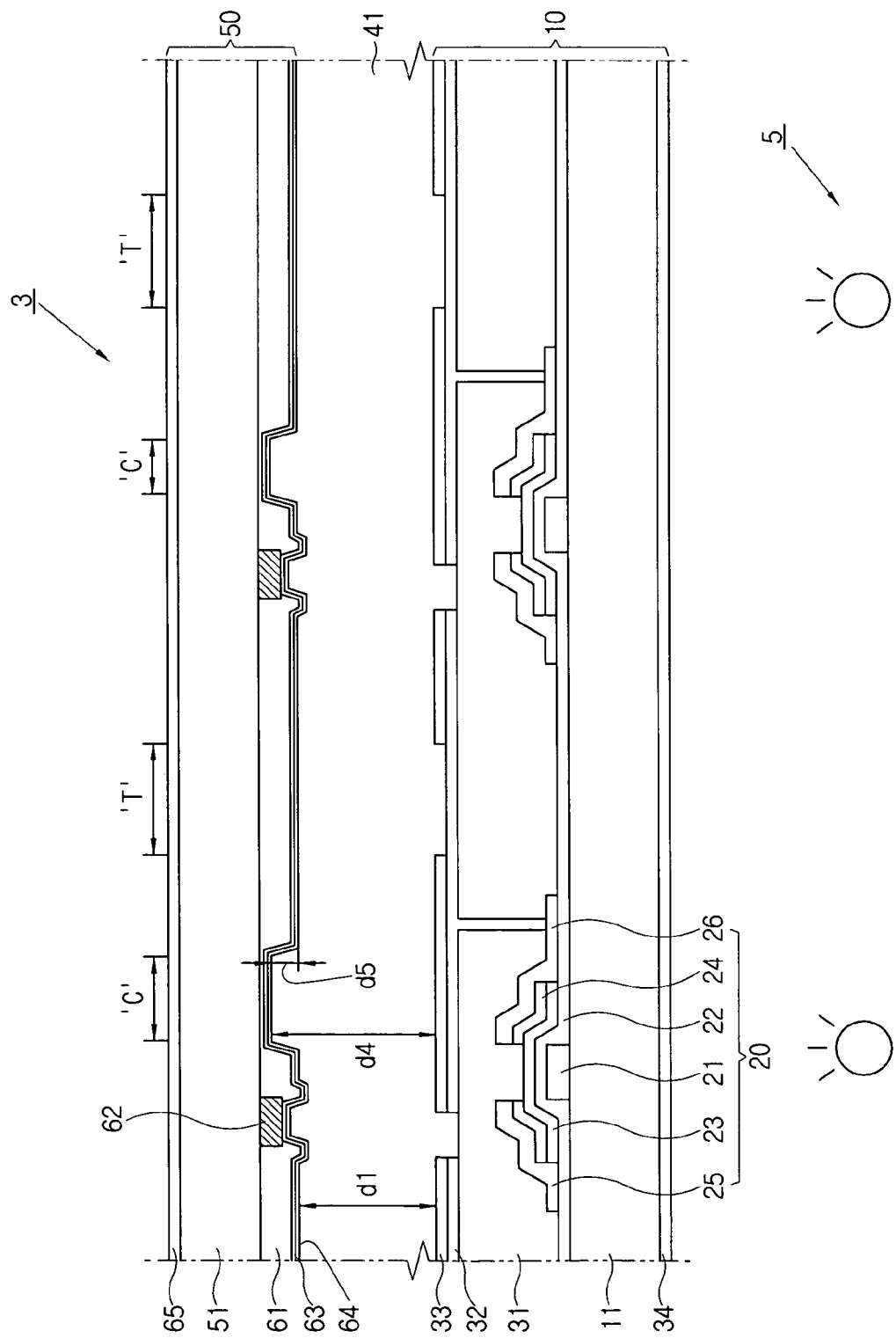

LIQUID CRYSTAL DISPLAY

CROSS-REFERENCE TO RELATED APPLICATIONS

This application claims the benefit of Korean Patent Application No. 2004-0037107, filed May 25, 2004, in the Korean Intellectual Property Office, the disclosure of which is incorporated herein by reference.

BACKGROUND OF THE INVENTION

1. Field of the Invention

The present invention relates to a semi-transmission liquid crystal display (LCD), and more particularly, to a semi-transmission LCD having good display quality without a overcoat layer flattenning a color filter layer.

2. Description of the Related Art

An LCD comprises a liquid crystal panel which comprises a thin film transistor (TFT) substrate, a color filter substrate and a liquid crystal layer sandwiched between the TFT substrate and the color filter substrate. Since the liquid crystal panel cannot emit light itself, a backlight unit may be located behind the TFT substrate to emit light. The transmittance of light from the backlight unit depends on the alignment of the liquid crystal layer. In addition, the LCD may further comprise a drive integrated circuit, a data driver, and a gate driver to drive a pixel, wherein the data driver and the gate driver receive a driving signal from the drive integrated circuit and then apply a driving voltage on a data line and a gate line within display area respectively.

The LCD may be divided into a transmission LCD and a reflection LCD according to the type of the light source. The transmission LCD was general type, in which the backlight unit is located behind the liquid crystal panel and the light from the backlight unit transmits the liquid crystal panel. The transmission LCD has a weak point in that it is high-power consumption, heavy and thick. The reflection LCD reflects the light from exterior, thus can restrict the use of the backlight unit which occupies up to 70% of the power consumption. Due to a rapid progress of portable communication apparatus, the reflection LCD which is low-power consumption, light and thin occupies more attention.

Meanwhile, a semi-transmission LCD which combines the merits of the transmission LCD and the reflection LCD can provide pertinent brightness regardless of the brightness of exterior. The semi-transmission LCD uses its backlight unit when exterior light is deficient in indoor environment and does not use its backlight unit but incident light when exterior light is sufficient in high-illumination environment.

In case of the semi-transmission LCD, the light from the backlight unit enters the liquid crystal layer passing through transmission area formed at the TFT substrate and then leaves the liquid crystal panel passing through the color filter layer formed at the color filter substrate. By the way, the light from the exterior enters the liquid crystal layer passing through the color filter layer formed at the color filter substrate, and leaves the liquid crystal panel passing through the color filter layer again after being reflected at the reflection area formed at the TFT substrate. That is, the light passing through the transmission area passes through the color filter layer once while the light reflected at the reflection area passes through the color filter layer twice. Thus the light reflected at the reflection area has 2 times more color reproduction property as compared with the light passing through the transmission area. Because of such an uniformity of the color reproduction property, the acknowledgement quality of the semi-transmission LCD is poor.

To solve above problem, a 2-tone mode is employed, wherein a part of color filter layer corresponding to the reflection area is removed or thinned. In the 2-tone mode, the uneven color filter layer is flattened by an overcoat layer. By the way, the use of overcoat layer may cause a trouble during a rubbing of a orientation layer. That is, a spot may be formed at the orientation layer because of the conglomerated overcoat layer at the edge of the color filter substrate

SUMMARY OF THE INVENTION

Accordingly, it is an aspect of the present invention to provide an semi-transmission LCD which has good display quality without a overcoat layer flattenning a color filter layer.

The foregoing and/or other aspects of the present disclosure can be achieved by providing a semi-transmission liquid crystal display comprising a liquid crystal panel; a backlight unit to emit light to the liquid crystal panel; and a data driver to apply a data voltage to a data line of the liquid crystal panel; wherein, the liquid crystal panel comprises a TFT substrate which has a transmission area transmitting light from the backlight unit and a reflection area reflecting light from exterior, a color filter substrate which has color filter layer having a concave area which is formed corresponding to the reflection area, and a liquid crystal layer which is sandwiched between the TFT substrate and the color filter substrate and having varying thickness according to the concave area; and the data driver applies the data voltage to the data line in the liquid crystal panel by a transmission voltage mode when the backlight unit is on and by a reflection voltage mode when the backlight unit is off.

According to an aspect of the invention, the color filter substrate comprises a insulating substrate, the color filter layer formed on the insulating substrate, a common electrode layer and an orientation layer which is formed on the color filter layer in sequence; wherein, the common electrode layer and the orientation layer have a shape which is corresponding to the concave area of the color filter layer.

According to an aspect of the invention a highest voltage of the data voltage in the reflection voltage mode is determined by measuring reflectance with respect to the data voltage.

According to an aspect of the invention the highest voltage of the data voltage is ±5% of the data voltage which shows a highest reflectance.

According to an aspect of the invention a gamma voltage which is added to the data voltage and controls a gamma characteristic is adjusted after determining the highest voltage of the data voltage.

According to an aspect of the invention the liquid crystal layer is vertically aligned (VA) mode.

According to an aspect of the invention the color filter layer in the concave area is removed.

BRIEF DESCRIPTION OF THE DRAWINGS

These and other aspects and advantages of the present invention will become apparent and more readily appreciated from the following description of the embodiments, taken in conjunction with the accompanying drawings of which:

FIG. 5 is a sectional view illustrating an LCD according to a second embodiment of the present.

DETAILED DESCRIPTION OF THE PREFERRED EMBODIMENT

Figure 1:
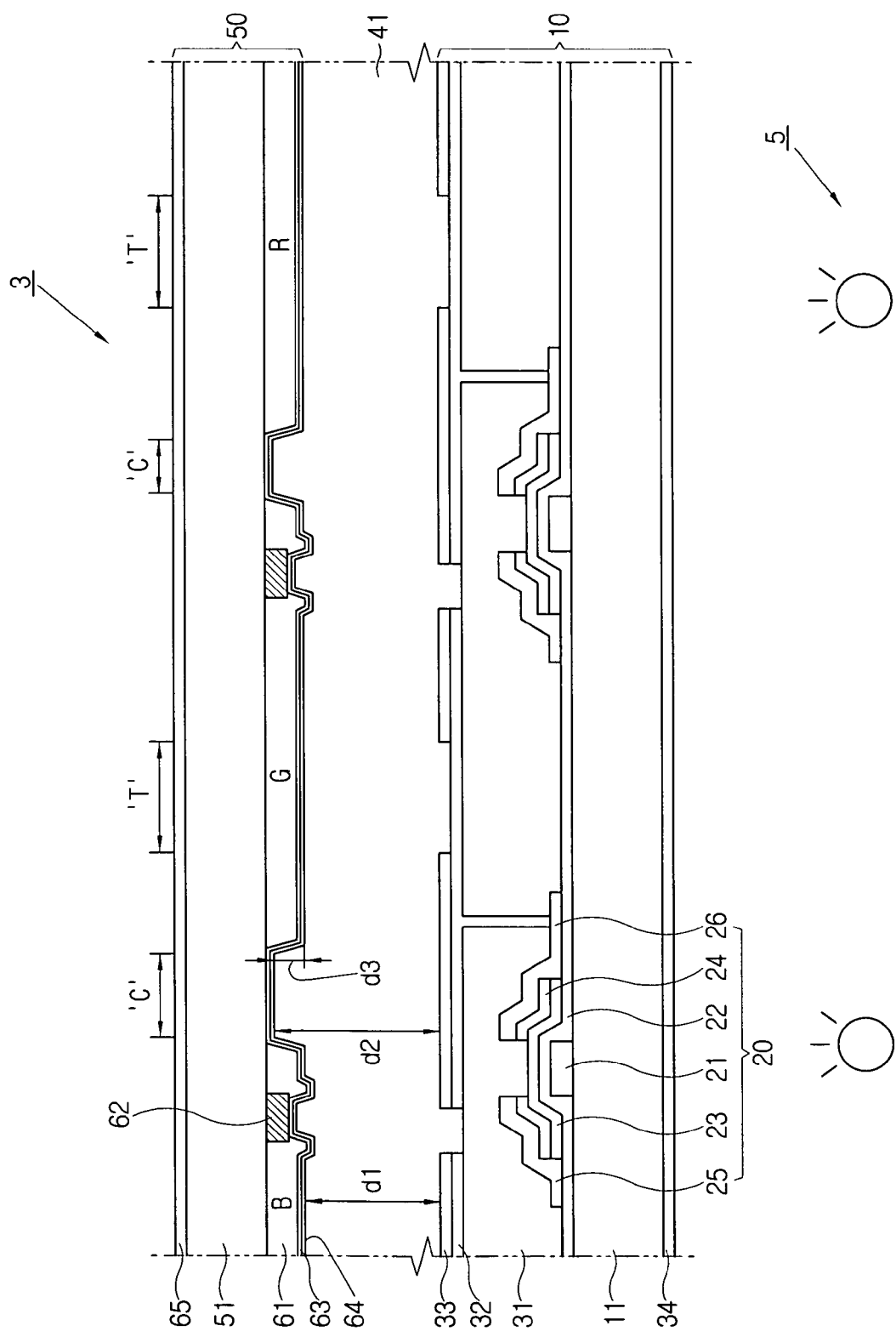
FIG. 1 is a sectional view illustrating an LCD according to a first embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 is a sectional view illustrating an LCD according to a first embodiment of the present invention. The LCD comprises a liquid crystal panel 3 and a backlight unit 5 which provides light to the liquid crystal panel 3. The backlight unit 5 may be side-type or edge-type.

The liquid crystal panel 3 comprises a TFT substrate 10, a color filter substrate 50 which is corresponding to the TFT substrate 10, and a liquid crystal layer 41 which is sandwiched between the TFT substrate 10 and the color filter substrate 50.

In the TFT substrate 10, a TFT 20, a protection layer 31, a pixel electrode 32, and a reflection layer 33 are formed on a first insulating substrate 11 in sequence. And a first polarizing sheet 34 is attached on the outside of the first insulating substrate 11.

The TFT 20 comprises a gate electrode 21 formed on the first insulating substrate 11, a gate insulating layer 22 formed on the first insulating substrate 11 and the gate electrode 21, a semiconductor layer 23 and a ohmic contact layer 24 which are formed in sequence on the gate insulating layer 22 being the gate electrode 21 as a center, and a source electrode 25 and a drain electrode 26 which are separately formed on the ohmic contact layer 24. Generally, the semiconductor layer 23 is made of an amorphous silicon and the ohmic contact layer 24 is made of an n+ amorphous silicon. And the semiconductor layer 23 and the ohmic contact layer 24 may be formed by plasma enhanced chemical vapor deposition (PECVD).

The protection layer 31, which is a organic insulating material such as photosensitive acryl-based resin, is formed on the TFT 20. The surface of the protection layer 31 may have an uneven part to improve the reflectance by inducing light scattering. Here, an inorganic insulating layer such as a silicon nitride layer may be formed between the TFT 20 and the protection layer 31 to give TFT 20 more credibility.

On the protection layer 31, a pixel electrode 32 is formed to apply a voltage to each pixel. The pixel electrode 32 is made of either indium tin oxide (ITO) or indium zinc oxide (IZO) and connected to the drain electrode 26 through the protection layer 31.

The reflection layer 33 is formed on the pixel electrode 32, and defines a transmission area ('T') and a reflection area. In the transmission area ('T') where the reflection layer 33 is removed, light from the backlight unit 5 can pass through and leave the liquid crystal panel 3. Meanwhile, in the reflection area in which the reflection layer 33 exists, light from exterior passes through and leaves the liquid crystal panel 3 after reflected at the reflection layer 33.

The color filter substrate 50 comprises a black matrix 62 formed on a second insulating substrate 51, a color filter layer 61 which is formed on each pixel alternating red, green and blue (RGB) with the black matrix 62 therebetween, and a common electrode layer 63 and an orientation layer 64 formed on the color filter layer 61. And a second polarizing sheet 65 is attached on the outside of the second insulating substrate 51.

The black matrix 62 is made of chrome (Cr) and chrome oxide ($CrO_2$) and formed corresponding to the source electrode 25 of the TFT substrate 10.

At each pixel, the color filter layer 61 has one color among RGB. The color filter layer 61 adjacent to the black matrix 62 is a little thick. Further the color filter layer 61 has a concave area ('C'), where the color filter layer 61 does not exist and formed corresponding to the reflection area of the TFT substrate 10. That is, some portion of light which is reflected at the reflection area leaves the liquid crystal panel 3 without passing through the color filter layer 61. The size of the concave area ('C') may be varied depends on the color of the color filter layer 61, where the size of the concave area preferably be reduced in the sequence of G, R and B.

The common electrode layer 63 and the orientation layer 64 are formed on the color filter layer 61. The common electrode layer 63 is generally made of ITO or IZO. The common electrode layer 63 and the orientation layer 64 have a shape corresponding to the shape of the color filter layer 61 including the concave area. Because there is no overcoat layer to flatten the color filter layer 61, the common electrode layer 63 and the orientation layer 64 have similar shape to the concave area of the color filter layer 61.

A liquid crystal layer 41 is formed between the TFT substrate 10 and the color filter substrate 50. The liquid crystal layer 41 changes its alignment according to electric fields which is generated by the pixel electrode 32 and the common electrode layer 63. The transmittance of light is controlled by the alignment of the liquid crystal layer 41. The liquid crystal layer 41 may be a VA (vertically aligned) mode. In VA mode, a liquid crystal molecule of the liquid crystal layer 41 is aligned vertically between the TFT substrate 10 and the color filter substrate 50 when no voltage is applied. If the first polarizing sheet 34 and the second polarizing sheet 65 are disposed perpendicularly each other, then the liquid crystal panel 3 is normally black. The liquid crystal layer 41 is preferably single domain VA mode requiring rubbing the orientation layer 64.

In the aforementioned liquid crystal panel 3, cellgap d1 or d2, the thickness of the liquid crystal layer 41 varies according to its position. The difference of d3 between the cellgap d2 of the concave area of the color filter layer 61 and the cell gap d1 of the other area is similar to the thickness of the color filter layer 61. The thickness of the color filter layer 61 is 1 to 1.5 μm and d1 is 3 to 4 μm, thus d2 is 4 to 5.5 μm. Thus, the average cellgap of the reflection area is larger than that of transmission area.

FIG. 2a through FIG. 2d are sectional view illustrating the making method of the color filter substrate 50.

Figure 2A:
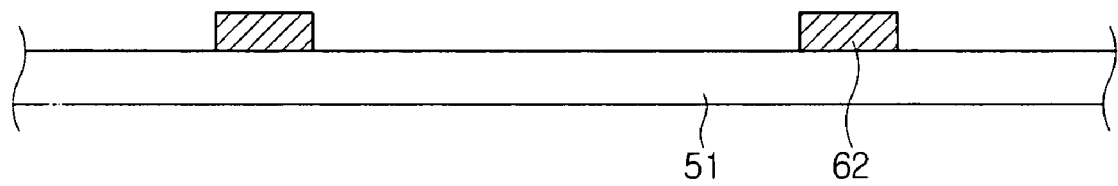
FIG. 2a through FIG. 2d are sectional view illustrating a making method of a color filter substrate.

At first, the black matrix 62 is formed on the second insulating substrate 51 as shown in FIG. 2a. The black matrix 62 is generally formed corresponding to the gate line 85 and the data line 86.

The black matrix 62 comprises the lower chrome oxide layer and upper chrome layer, where the thickness of the chrome oxide layer is about 500 Å and the thickness of the chrome layer is about 1500 Å. In the manufacturing process, there is consecutive deposition of the chrome oxide and chrome, lithography and etching.

Figure 2B:
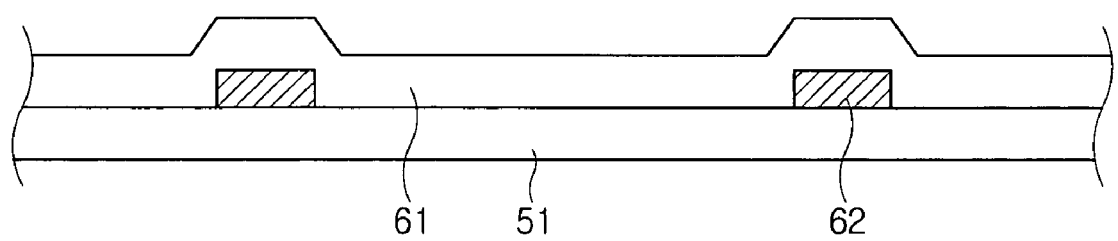

After the black matrix 62 is formed on the second insulating substrate 51, the color filter layer 61 of one color is coated on the black matrix 62 as shown in FIG. 2b. The color filter layer 61 of one color is also coated on the second insulating substrate 51 which is not covered by the black matrix 62.

Figure 2C:
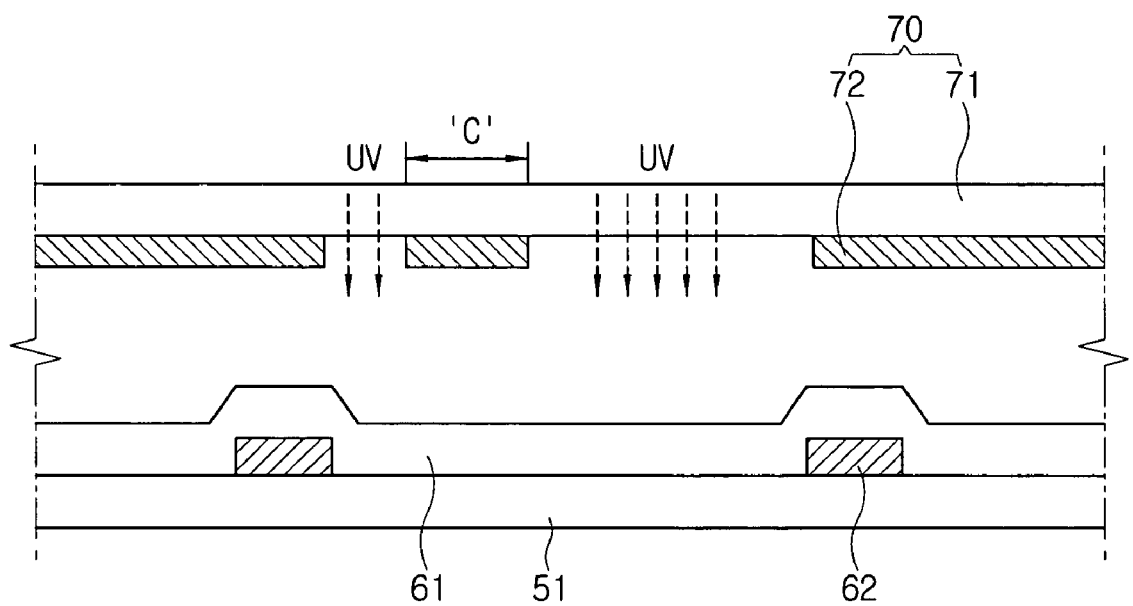

After the coating of the color filter layer 61 of one color, the color filter layer 61 is exposed to UV as shown in FIG. 2c. If the color filter layer 61 is made of negative photosensitive material, UV is radiated to the color filter layer 61 to be left. A mask 70 comprises a transparent substrate 71 and a mask pattern 72, where the mask pattern blocks off the UV and has removed in part corresponding to the color filter layer 61 to be left. In exposing to UV, the concave area of the color filter layer 61 is not exposed to the UV.

Figure 2D:
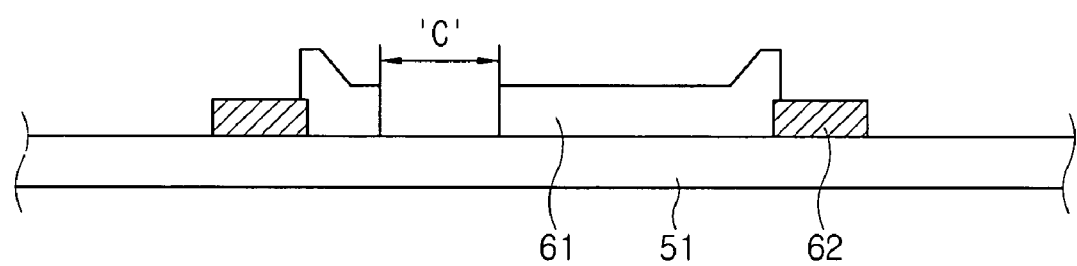

FIG. 2d shows the color filter substrate 50 after development and baking. The color filter layer 61 which is exposed to UV is remained and the color filter layer 61 which is not exposed to UV is removed. The color filter layer 61 in each pixel has the concave area ('C'), which corresponds to the reflection area of the TFT substrate 10. With this, the color filter layer 61 of one color is completed. And the color filter layer 61 is completed by forming the color filter layer 61 of the remaining two colors. To make differently the size of the concave area depending on RGB, a plurality of masks 70 is necessary.

Then the common electrode layer 63 is formed without flattening by overcoat layer. The color filter substrate 50 is completed by coating and rubbing the orientation layer 64. Here, spot does not occur during the rubbing of the orientation layer 64 because there is no overcoat layer. The completed color filter substrate 50 has the concave area ('C') with the common electrode layer 63 and the orientation layer 64 having the similar concave.

Figure 3:
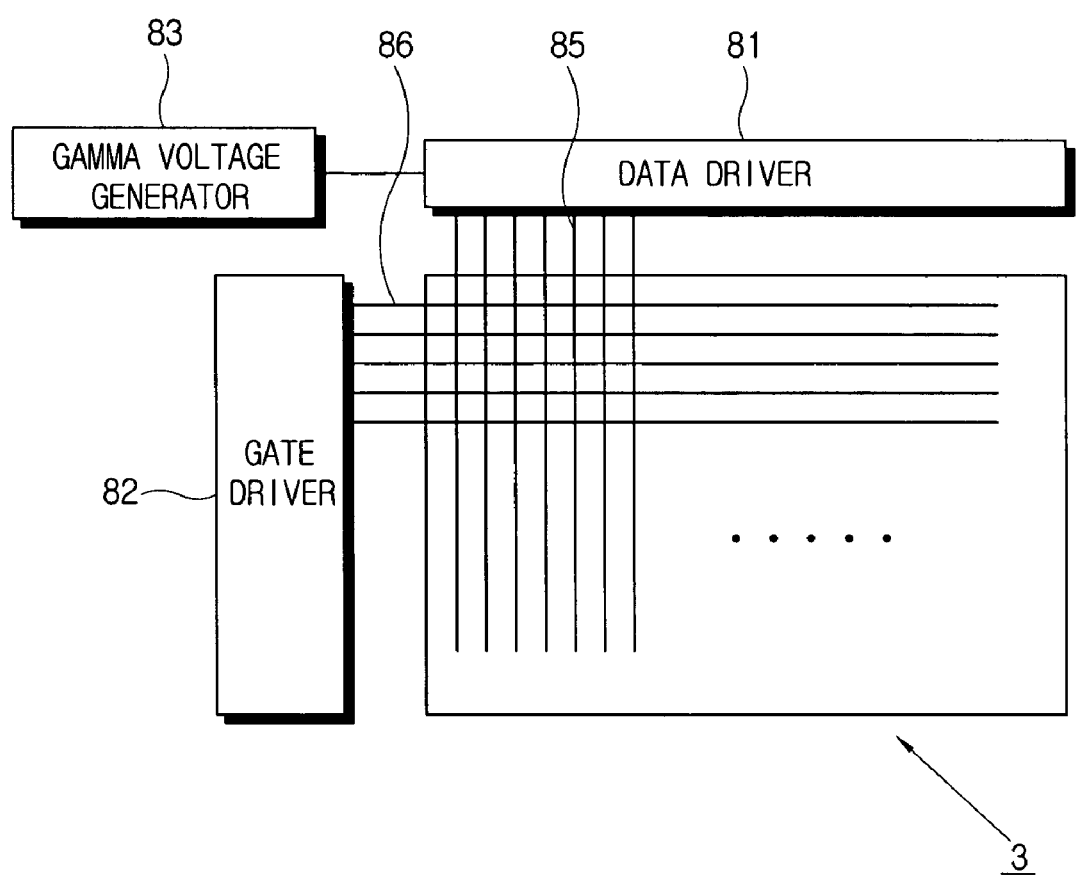
FIG. 3 is a concept view illustrating driving of a LCD.

FIG. 3 is a concept view illustrating driving of the LCD. A gate driver 82 drives the TFT 20 connected to a corresponding gate line 85 by applying a gate voltage to a plurality of gate lines 85 one by one formed in the liquid crystal panel 3.

A data driver 81 applies a data voltage of one horizontal line to the data line 86 formed in the liquid crystal panel 3 during one horizontal period being supplied the gate voltage.

The LCD displays a picture by adjusting transmittance of the liquid crystal layer 41, which is controlled by the data voltage. By the way, the LCD has a gamma characteristic in which the gradation level of picture does not change linearly with respect to the picture signal's voltage level. The non-linear gamma characteristic is caused by not only that the transmittance of liquid crystal layer 41 does not change linearly with respect to the voltage level but also that the gradation level of the picture does not change linearly with respect to the transmittance of the liquid crystal layer 41. A gamma voltage generator 83 adjusts the gamma characteristic by adding a gamma voltage to the picture signal's voltage level, which is predetermined to have various level depending on the picture signal's voltage level.

The data driver 81 applies the data voltage, which is modified picture signal's voltage level considering the gamma voltage from the gamma voltage generator 83.

In present invention, the application of the data voltage has dual mode, one of which is a reflection voltage mode and the other of which is a transmission voltage mode. For example, the gamma mode voltage may be different between in the reflection voltage mode and in the transmission voltage mode. More specifically, the data voltage according to the reflection voltage mode is applied to the data line 86 in reflection mode where the backlight 5 is off, and the data voltage according to the transmission voltage mode is applied to the data line 86 in transmission mode where the backlight 5 is on.

The travel length of light in the liquid crystal layer 41 and in the color filter layer 61 is different depending on the path of light through which one of the trasmission and the reflection area. This problem can be solved to give excellent color regeneration property regardless of the path of the light by adopting above mentioned dual voltage mode.

The LCD according to the first embodiment of this invention has reflection area which has two areas with different cellgap, which is not occurred to the conventional LCD. So, the data voltage in the reflection mode is preferably different from that of the conventional LCD. By the way, a maximum voltage to be applied to the data lines 86 can be determined as follows.

Figure 4A:
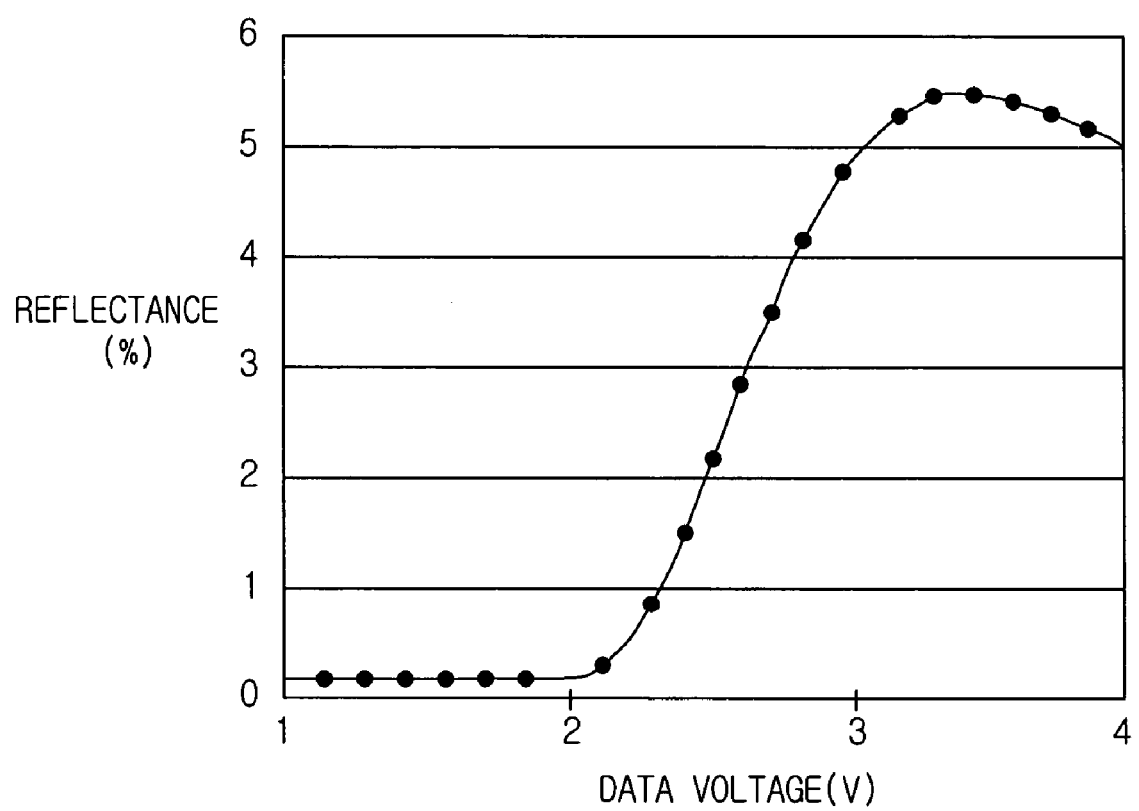
FIG. 4a and FIG. 4b show reflectance with respect to a data voltage of conventional LCD using overcoat layer and an LCD according to a first embodiment of the present invention respectively.
Figure 4B:
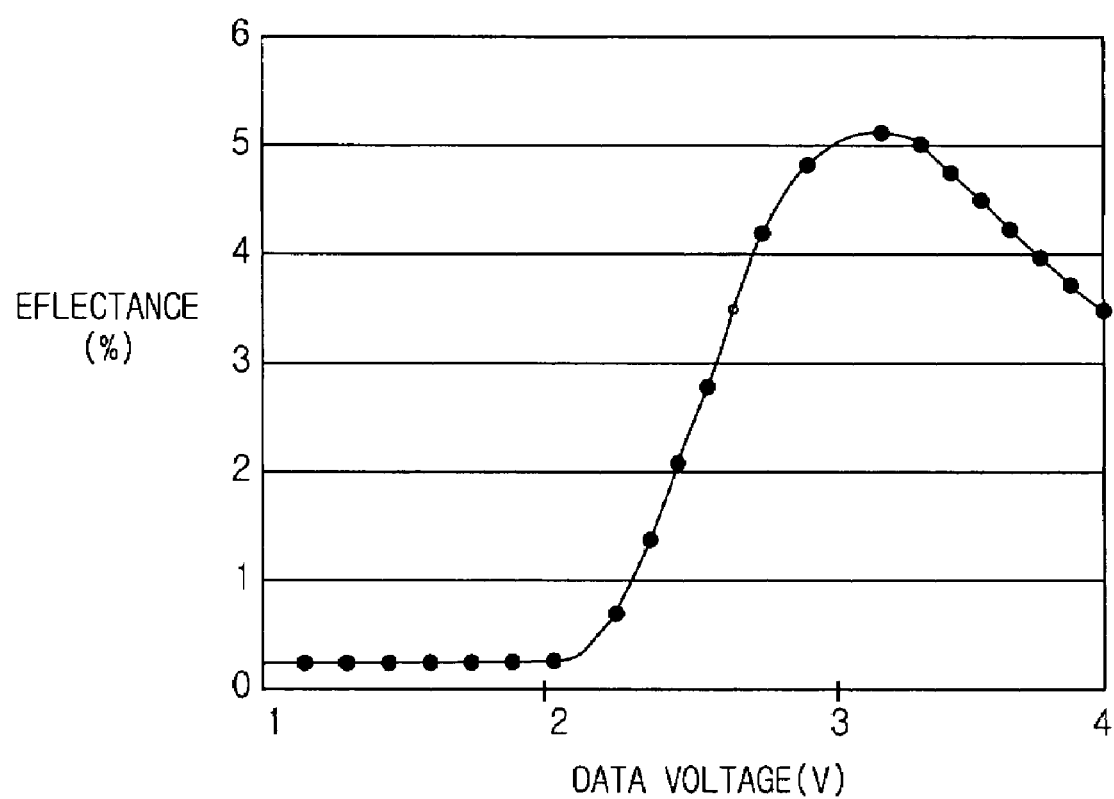

FIG. 4a and FIG. 4b show reflectance with respect to the data voltage of conventional LCD using overcoat layer and of the LCD according to a first embodiment of the present invention respectively. The reflectance curve with respect to the applied data voltage shows different shape between the two cases. In the conventional LCD, the data voltage having a maximum voltage is 3.45V and that of the LCD according to a first embodiment of the present invention is 3.2V. So, in the first embodiment of the present invention, the maximum voltage may be determined closely to 3.2V, or within ±5% of 3.2V. The adjusting of the gamma voltage follows the determination of the maximum voltage.

The response time in reflection area is expected to be delayed due to the increase of the cellgap. However, the delay of the response time is acceptable level of 35 ms, which is comparable to 25 ms of the conventional LCD.

FIG. 5 is a sectional view illustrating an LCD according to a second embodiment of the present. The difference between the first embodiment and the second embodiment is as following.

In the second embodiment, the color filter layer 61 has the concave area ('C') corresponding to the reflection area of the TFT substrate 10 as in the first embodiment. However, as shown in FIG. 5, the color filter layer 61 in the concave area ('C') is not completely removed but just has reduced thickness with respect to the other area. Herein, the thickness of the cellgap d1 where the concave is not formed and the thickness of the cellgap d4 where the concave is formed is different. And the difference of thickness in two cellgaps d1, d4 is about the thickness of the concave area d5, which is smaller than that of the first embodiment.

Determining the maximum voltage of the data voltage and adjusting the gamma voltage according to the maximum voltage in the first embodiment is also applicable to the second embodiment.

The present invention is applicable to the case in which the cellgap is increased in the reflection area due to the removing the overcoat layer for flattening. That is, the improvement of display quality such as color reproduction can be achieved by adopting the dual voltage mode, with removing the rubbing spot caused by the overcoat layer.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A semi-transmission liquid crystal display comprising
a liquid crystal panel;
a backlight unit to emit light to the liquid crystal panel; and
a data driver to apply a data voltage to a data line of the liquid crystal panel;
wherein, the liquid crystal panel comprises a TFT substrate which has a transmission area transmitting light from the backlight unit and a reflection area reflecting light from exterior, a color filter substrate which comprises a color filter layer having a concave area which is formed corresponding to the reflection area, and a liquid crystal layer which is sandwiched between the TFT substrate and the color filter substrate and having varying thickness according to the concave area; and the data driver applies the data voltage to the data line in the liquid crystal panel by a transmission voltage mode when the backlight unit is on and by a reflection voltage mode when the backlight unit is off, wherein the thickness of the liquid crystal layer is thicker in the reflection area than in the transmission area.

2. The semi-transmission liquid crystal display according to claim 1, wherein the color filter substrate further comprises an insulating substrate disposed under the color filter layer, a common electrode layer disposed on the color filter layer, and an orientation layer disposed on the common electrode layer;

wherein the common electrode layer and the orientation layer have a shape conformal to the concave area of the color filter layer.

3. The semi-transmission liquid crystal display according to claim 1, wherein a highest voltage of the data voltage in the reflection voltage mode is determined by measuring reflectance as a function of the data voltage.

4. The semi-transmission liquid crystal display according to claim 3, wherein the highest value of the data voltage in the reflection voltage mode is in a range of ±5% of the data voltage which shows a highest reflectance.

5. The semi-transmission liquid crystal display according to claim 3, wherein a gamma voltage which is added to the data voltage and controls a gamma characteristic is adjusted after determining the highest value of the data voltage in the reflection voltage mode.

6. The semi-transmission liquid crystal display according to claim 1, wherein the liquid crystal layer is in a vertically aligned (VA) mode.

7. The semi-transmission liquid crystal display according to claim 1, wherein the color filter layer has a hole in the concave area.

8. The semi-transmission liquid crystal display according to claim 1 wherein the thickness of the liquid crystal layer varies according to its position.

9. A semi-transmission liquid crystal display comprising
a liquid crystal panel;
a backlight unit to emit light to the liquid crystal panel; and
a data driver to apply a data voltage to a data line of the liquid crystal panel;
wherein, the liquid crystal panel comprises a TFT substrate which has a transmission area transmitting light from the backlight unit and a reflection area reflecting light from exterior, a color filter substrate which comprises a color filter layer having a concave area which is formed corresponding to the reflection area, and a liquid crystal layer which is sandwiched between the TFT substrate and the color filter substrate and having varying thickness according to the concave area; and
the data driver applies the data voltage to the data line in the liquid crystal panel by a transmission voltage mode when the backlight unit is on and by a reflection voltage mode when the backlight unit is off,
wherein a difference between a cellgap of a concave area of the color filter layer and a cellgap of a non-concave area is substantially the thickness of the color filter layer.

10. A semi-transmission liquid crystal display comprising
a liquid crystal panel;
a backlight unit to emit light to the liquid crystal panel; and
a data driver to apply a data voltage to a data line of the liquid crystal panel;

wherein, the liquid crystal panel comprises a TFT substrate which has a transmission area transmitting light from the backlight unit and a reflection area reflecting light from exterior, a color filter substrate which comprises a color filter layer having a concave area which is formed corresponding to the reflection area, and a liquid crystal layer which is sandwiched between the TFT substrate and the color filter substrate and having varying thickness according to the concave area; and
the data driver applies the data voltage to the data line in the liquid crystal panel by a transmission voltage mode when the backlight unit is on and by a reflection voltage mode when the backlight unit is off,
wherein the thickness of the color filter layer is between about 1 to about 1.5 µm, the thickness of the liquid crystal layer in a non-concave areas is between about 3 to about 4 µm, and the thickness of the liquid crystal layer in a concave area is between about 4 to about 5.5 µm.

11. A semi-transmission liquid crystal display comprising
a liquid crystal panel;
a backlight unit to emit light to the liquid crystal panel; and
a data driver to apply a data voltage to a data line of the liquid crystal panel;
wherein, the liquid crystal panel comprises a TFT substrate which has a transmission area transmitting light from the backlight unit and a reflection area reflecting light from exterior, a color filter substrate which comprises a color filter layer having a concave area which is formed corresponding to the reflection area, and a liquid crystal layer which is sandwiched between the TFT substrate and the color filter substrate and having varying thickness according to the concave area; and
the data driver applies the data voltage to the data line in the liquid crystal panel by a transmission voltage mode when the backlight unit is on and by a reflection voltage mode when the backlight unit is off,
wherein an average cellgap of the reflection area is larger than that of the trasmission area.

12. A semi-transmission liquid crystal display comprising
a liquid crystal panel;
a backlight unit to emit light to the liquid crystal panel; and
a data driver to apply a data voltage to a data line of the liquid crystal panel;
wherein, the liquid crystal panel comprises a TFT substrate which has a transmission area transmitting light from the backlight unit and a reflection area reflecting light from exterior, a color filter substrate which comprises a color filter layer having a concave area which is formed corresponding to the reflection area, and a liquid crystal layer which is sandwiched between the TFT substrate and the color filter substrate and having varying thickness according to the concave area; and
the data driver applies the data voltage to the data line in the liquid crystal panel by a transmission voltage mode when the backlight unit is on and by a reflection voltage mode when the backlight unit is off,
wherein a cellgap is substantially uniform except for at the concave area.

13. The semi-transmission liquid crystal display according to claim 12 wherein the TFT substrate has a top surface having a substantially uniform height.

14. The semi-transmission liquid crystal display according to claim 13 wherein a cell gap in the reflection area except for at the concave area is substantially the same as a cell gap in the transmission area.

15. The semi-transmission liquid crystal display according to claim 14 wherein the TFT substrate comprises a pixel electrode disposed in the reflection area and the transmission area and a reflection layer disposed in the reflection area.

16. The semi-transmission liquid crystal display according to claim 15 wherein the TFT substrate further comprises a protection layer disposed under the pixel electrode and the reflection layer and having a top surface that has a uniform height in the reflection area and in the transmission area.

17. The semi-transmission liquid crystal display according to claim 2 wherein the common electrode layer is in contact with the color filter layer.

* * * * *